United States Patent [19]
Tsukimoto

[11] 4,270,567
[45] Jun. 2, 1981

[54] CONTROL VALVE FOR USE IN HYDRAULIC APPARATUS

[75] Inventor: Toshiaki Tsukimoto, Zama, Japan

[73] Assignee: Toshiba Kikai Kabushiki Kaisha, Tokyo, Japan

[21] Appl. No.: 109,392

[22] Filed: Jan. 3, 1980

[30] Foreign Application Priority Data

Jan. 12, 1979 [JP] Japan ............................. 54/2351[U]

[51] Int. Cl.³ .................................... F16K 17/196
[52] U.S. Cl. ............................. 137/493.5; 137/493.3
[58] Field of Search ............... 137/493.3, 493.4, 493.5, 137/493.9

[56] References Cited

U.S. PATENT DOCUMENTS

| | | | |
|---|---|---|---|
| 807,269 | 12/1905 | Hildebrand | 137/493.3 UX |
| 3,112,763 | 12/1963 | Tennis | 137/493.5 |
| 3,856,041 | 12/1974 | Cryder | 137/493.6 |
| 4,016,903 | 4/1977 | Akashi | 137/493.5 |
| 4,217,927 | 8/1980 | Morita | 137/493.3 |

*Primary Examiner*—Robert G. Nilson
*Attorney, Agent, or Firm*—Koda and Androlia

[57] ABSTRACT

A control valve operating as a combined relief and make-up valve for use in hydraulic apparatus comprises a valve housing provided with a blind hole, a valve seat tightly engaged with the inlet of the blind hole, a cylindrical hollow make-up poppet slidably inserted into the blind hole, a cylindrical relief poppet slidably inserted within the make-up poppet, a screw member adjustably engaged with the inner surface of the end of the make-up poppet, a coil spring disposed between the screw member and the relief poppet, and a balance piston having one end tightly inserted into the inner cylindrical hole of the relief poppet. The valve housing is provided with a first opening connected to an external hydraulic supply device and a second opening connected to a hydraulic source. The first and second openings are communicated with each other in response to differential pressure of an operating fluid so as to operate the control valve as a relief valve or a make-up valve.

3 Claims, 1 Drawing Figure

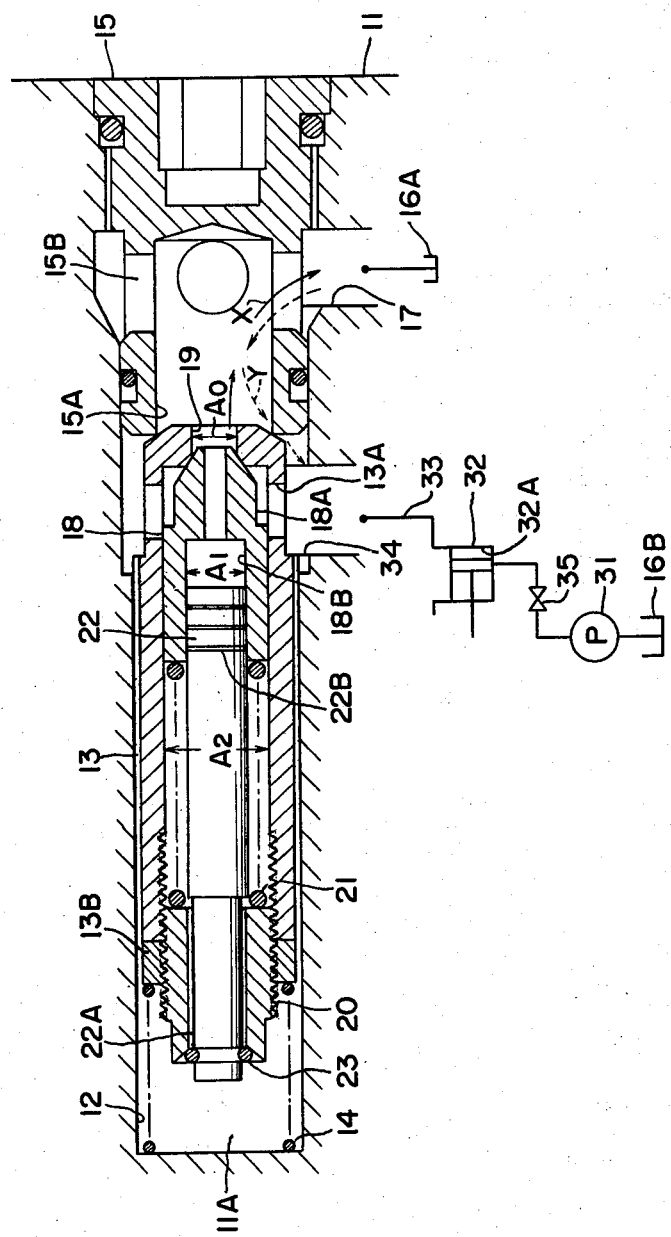

CONTROL VALVE FOR USE IN HYDRAULIC APPARATUS

BACKGROUND OF THE INVENTION

This invention relates to a control valve for use in hydraulic apparatus which operates as a combined relief and make-up valve in response to a high or low pressure in an accumulator of the hydraulic apparatus.

Generally, in hydraulic apparatus a control valve is used as a combined relief and make-up valve so as to operate in response to a hydraulic pressure supplied by hydraulic pump means. As the control valve of this kind there is usually used a direct operating type control valve in which pressurized oil is supplied through one opening formed through a valve housing into the valve and connected to an oil tank, and the diameter of a valve seat contacting with a relief poppet of the control valve is designed to be considerably large so as to reduce resistance against the pressure of the oil passing through a passage of the relief valve. For this reason, a considerably large or strong spring means must be used to act against the oil pressure to suitably set the oil pressure in the control valve.

Therefore, such a direct operating type control valve cannot be made to be compact because it is inevitable to use a considerably large and strong spring means and, otherwise, the reliability of the spring would not be assured.

SUMMARY OF THE INVENTION

An object of this invention is to provide an improved compact control valve for use in hydraulic apparatus capable of accurately operating as a combined relief and make-up valve with high reliability by utilizing a differential pressure of pressurized fluid supplied into the control valve.

According to this invention, the above object can be accomplished by providing a control valve operating as a relief and make-up valve for use in hydraulic apparatus characterized in that the control valve comprises a valve housing provided with a cylindrical blind hole, a first opening connected to an external hydraulic supply device and a second opening connected to a hydraulic tank, a valve seat tightly engaged with the inlet of the blind hole to close the inlet and provided with an inner recess communicated with the second opening, a cylindrical hollow make-up poppet slidably inserted into the blind hole, the make-up poppet having a bottomed end at one end provided with an opening communicated with the inner recess of the valve seat and having a hole communicated with the first opening, a first resilient member disposed between the bottom of the blind hole and the other end of the make-up poppet so as to loosely urging the make-up poppet, a cylindrical relief poppet slidably inserted within the make-up poppet and provided with an inner cylindrical hole which communicates with the inner recess of the valve seat, the inner diameter of the relief poppet being predetermined to be larger than the diameter of the end opening of the make-up poppet, screw means adjustably engaged with the inner surface of the other end of the make-up poppet, a second resilient member disposed within the make-up poppet and between the screw means and the relief poppet, and a balance piston having one end tightly inserted into the inner cylindrical hole of the relief poppet and the other end connected to a piston rod which is engaged with the screw means.

BRIEF DESCRIPTION OF THE DRAWING

The accompanying single drawing shows a longitudinal cross-sectional view of a control valve for use in hydraulic apparatus operating as a combined relief and make-up valve according to this invention.

DESCRIPTION OF THE PREFERRED EMBODIMENT

In the accompanying drawing, a valve housing 11 disposed in a conduit of hydraulic apparatus, not shown, is provided with a blind hole 12, within which a cylindrical make-up poppet 13 is slidably inserted and the make-up poppet 13 has a bottom provided with an opening 19 on the side opposite to the bottom of the blind hole 12. A relatively weak urging resilient member, preferably a coil spring 14 is disposed between the open end of the make-up poppet 13 and the bottom of the blind hole 12 so that the make-up poppet 13 is always urged rightwardly as viewed in the drawing. At the inlet of the blind hole, a valve seat 15 is secured to the valve housing 11 and the valve seat 15 is provided with a recess 15A and a plurality of holes 15B. The holes 15B communicate with an opening 17 which is connected to an oil tank 16A. Another opening 34 is provided for the valve housing, which is connected through a pipe 33 to an actuator such as a hydraulic cylinder-piston assembly 32 connected through a pump 31 to an oil tank 16B. The oil tanks 16A and 16B are usually commonly used. A direction transfer valve 35 of the known type is disposed between the actuator 32 and the pump 31 to change the oil flow direction.

A cylindrical relief poppet 18 is slidably inserted into the cylindrical make-up poppet 13 and the opening of the bottom of the make-up poppet 13 is usually closed on the inside thereof by a protruded portion 18A of the relief poppet 18. An adjusting screw member 20 is engaged with the inner surface of the end portion of the make-up poppet 13 and a resilient member, preferably a spring, 21 is inserted within the make-up poppet 13 and between the adjusting screw 20 and the relief poppet 18 as shown in the drawing, so that the relief poppet 18 is always urged rightwardly. The spring force urging the relief poppet 18 can be adjusted by the screw member 20.

A balance piston 22 having one end tightly fitted into an inner cylindrical recess 18B of the relief poppet 18 and having the other end connected to a piston rod 22A which is loosely inserted into the inner cylindrical bore of the adjusting screw 20. The free end of the piston rod 22A is fitted with a snap ring 23 thereby to prevent the balance piston 22 from moving rightwardly as viewed in the drawing. In order to tightly engage the balance piston 22 with the relief poppet 18, a labyrinth packing 22B is provided for the balance piston 22, but an O-ring may be used in stead of the labyrinth packing. Oil flow grooves, not shown, may be formed on the outer surface of the make-up poppet 13 in its longitudinal direction.

The control valve according to this invention operates as follows.

Pressurized oil in the tank 16B is introduced into the actuator 32 by the operation of the pump 31 and the oil is then admitted through a pipe 33 into the opening 34 of the valve housing 11 and the opening 13A of the make-up poppet 13 to act on the relief poppet 18. The force urging leftwardly the relief poppet 18 is represented by an equation $F_1=(\pi/4)(A_2{}^2-A_0{}^2)\cdot P$, where $A_2$ represents the outer diameter of the relief poppet 18, $A_0$: the inner diameter of the opening 19 of the make-up poppet 13, and P: oil pressure. The pressurized oil introduced into the opening 34 flows into a lefthand chamber 11A of the hole 12 through a small gap formed between the make-up poppet 13 and the valve housing 11 and then acts on the left side end of the relief poppet 18 through a small gap formed between the piston rod 22A and the adjusting screw 20. Accordingly, the force urging rightwardly the relief poppet 18 is represented by an equation $F_2=(\pi/4)(A_2{}^2-A_1{}^2)\cdot P$, where $A_1$ represents the inner diameter of the recess 18B of the relief poppet 18. With the control valve according to the embodiment of this invention shown in the drawing, it is to be noted that the diameter $A_1$ is designed to be larger than the diameter $A_0$.

In a usual condition of the control valve as shown in the drawing, the relief poppet 18 is urged rightwardly by the spring 21 and the front end of the relief poppet 18 closes the opening 19 of the make-up poppet 13. In this state, the communication between the openings 34 and 17 is shut-off, and when the hydraulic cylinder-piston assembly 32 operates, the pressurized oil is fed into the opening 34 so as to act on the relief poppet 18.

When the differential force F between $F_1$ and $F_2$ exceeds the spring force of the spring 21, i.e. when the force expressed by an equation $F=F_1-F_2=(\pi/4)(A_1{}^2-A_0{}^2)\cdot P$ exceeds the spring force, the relief poppet 18 moves leftwardly and both openings 34 and 17 is communicated with each other, whereby the pressurized oil flows through the gap between the opening 19 and the protruded portion 18A of the relief poppet 18 as shown by a solid line arrow X in the drawing. At this time, the make-up poppet 13 urged rightwardly by the coil spring 14 is not moved leftwardly.

In the meantime, the control valve according to this invention operates as a make-up valve in a manner described hereunder.

When the oil pressure in the chamber 32A of the actuator 32 is abnormally lowered by an external factor, for example, an inertia force created at the time of stopping the operation of the actuator 32, and in such a case, considerably low oil pressure is applied to the left side of the make-up poppet 13 through the gap between the valve housing 11 and the make-up poppet 13, and this pressure is lower than the pressure applied to the right side thereof which is communicated with the tank 16A through the opening 17. Thus, the make-up poppet 13 moves leftwardly and the openings 34 and 17 are communicated with each other, whereby the oil in the tank 16A flows into the chamber 32A through the gap between the valve seat 15 and the make-up poppet 13 as shown by a dotted line arrow Y to prevent the creation of the vacuum condition, i.e. caviation, in the chamber 32A. In thus manner the control valve according to this invention operates as a make-up valve. At this time even if a considerably large pressure is applied to the one end of the balance piston 22 through the opening 19, the other end thereof abuts to the adjusting screw 20 thus preventing the leftward movement of the piston 22.

As described hereinabove, according to this invention, there are provided two oil supplying openings 17 and 34 through the valve housing so that a considerably small differential force is applied to a relief poppet. Thus, to resist against this force, it is possible to use a small and weak relief spring and, therefore, there is provided a compact control valve for use in hydraulic apparatus which acts as a combined relief and make-up valve.

I claim:

1. A control valve operating as a combined release and make-up valve for use in hydraulic apparatus comprising:
   a valve housing provided with a cylindrical blind hole, a first opening connected to an external hydraulic supply device and a second opening connected to a hydraulic tank;
   a valve seat tightly engaged with the inlet of said blind hole to close said inlet and provided with an inner recess communicated with said second opening;
   a cylindrical hollow make-up poppet slidably inserted into said blind hole, said make-up poppet having a bottom end at one end provided with an opening communicated with said inner recess of said valve seat and having a hole communicated with said first opening;
   a first resilient member disposed between the bottom of said blind hole and the other end of said make-up poppet so as to resiliently urge the make-up poppet towards said valve seat;
   a cylindrical release poppet slidably inserted within said make-up poppet and provided with an inner cylindrical hole which communicates with said inner recess of said valve seat, an inner diameter of said inner cylindrical hole of said relief poppet being predetermined to be larger than the diameter of said end opening of said make-up poppet;
   screw means adjustably engaged with the inner surface of the other end of said make-up poppet;
   a cylindrical resilient member disposed within said make-up poppet between said screw means and said relief poppet; and
   a balanced poppet having one end tightly inserted into said inner cylindrical hole of said relief poppet and the other end connected to a piston rod which is engaged with said screw means.

2. The control valve according to claim 1 wherein said first and second resilient members are springs.

3. The control valve according to claim 1 wherein a labyrinth packing is provided for one end of said balance piston inserted into said relief poppet.

* * * * *